R. W. MORSE.
VEHICLE SPRING.
APPLICATION FILED JAN. 27, 1908.

953,750.

Patented Apr. 5, 1910.

Witnesses:
Harry H. Hussey.
Edward E. Ogger.

Inventor:
Ralph W. Morse
per Clark C. Wood
Attorney.

UNITED STATES PATENT OFFICE.

RALPH W. MORSE, OF LANSING, MICHIGAN.

VEHICLE-SPRING.

953,750.

Specification of Letters Patent.   Patented Apr. 5, 1910.

Application filed January 27, 1908.  Serial No. 412,924.

*To all whom it may concern:*

Be it known that I, RALPH W. MORSE, a citizen of the United States, residing at Lansing, in the county of Ingham and State of Michigan, have invented certain new and useful Improvements in Vehicle-Springs, of which the following is a specification.

My invention relates to vehicle springs and its purpose is to produce a spring that shall be free from the danger of breakage by buckling or by the shocks and jars of the road and yet shall possess the highest degree of elasticity. While it is primarily intended for automobiles, it is applicable to many other sorts of wheeled vehicles.

Figure 5:
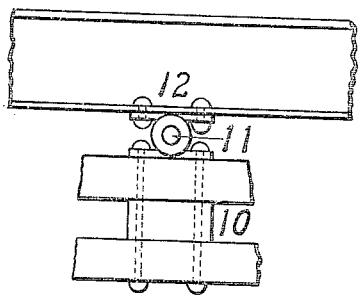
Figure 4:
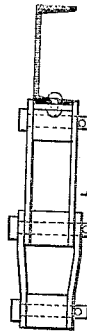
Figure 1:
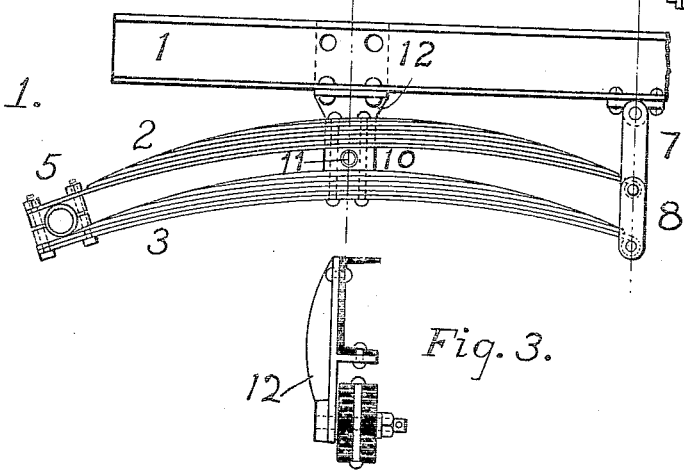
Figure 3:
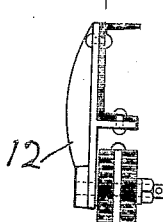
Figure 2:
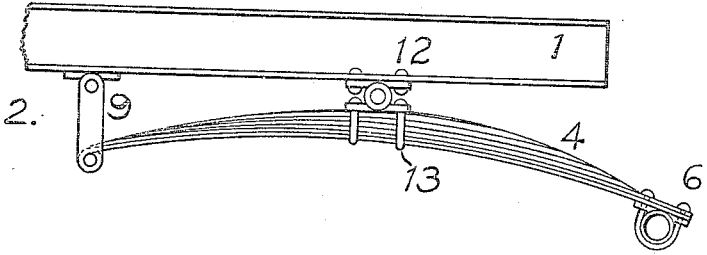

In the drawings, Figure 1 is an elevation of part of one side of an automobile frame with the rear spring attached. Fig. 2 is a similar elevation showing the front spring or the form of spring used for light loads. Figs. 3 and 4 are details, and Fig. 5 shows a modified form of the means of attaching the spring to the frame.

In the drawings, similar figures refer to similar parts in the different views.

1 is the side of the frame of the vehicle. To this the springs are pivotally connected at their middle points, as shown in Figs. 1 and 2. Either the rear or front springs may, if desired, be compound, as shown in Fig. 1. That is, they may be composed of two or more springs, so formed as to operate as one. The springs themselves are preferably of the ordinary leaf construction. The rear extremity of the rear spring and the front extremity of the front spring are clamped to the respective axles of the vehicle by clamps 5 and 6 and the front extremity of the rear spring and the rear extremity of the front spring are pivotally connected by links 7, 8 and 9 to the frame. In the construction shown in Fig. 1 the middle points of the rear springs are not connected directly to the frame, but a block, 10, is inserted between the springs through which the pivot, 11, passes and is secured to an offset piece, 12, bolted or otherwise securely fastened to the side of the frame. At present, I prefer this construction, but the construction shown in Fig. 5 in which the pivotal connection is made on the top of the upper set of springs may, also, be employed without departing from my invention.

It is evident that, as the load is increased, the springs will straighten, and consequently be less apt to yield to the tendency to buckle produced by the push of the rear driver, if employed on an automobile, and this stiffness against buckling will be further increased by the fact that the push is exerted on the rear half of the spring instead of on the whole length, as in the ordinary construction. Besides, if needful, the rear portion of the spring can be stiffened to meet the extra load. The same is true of the operation of the front spring, if used on an ordinary vehicle, where the pull is on the front axle. In that case the pull is only on the front half of the spring, making it much less liable to injury. It is also evident that by this construction the full elasticity of the springs is preserved.

I claim as my invention and desire to secure by Letters Patent,

The combination with the frame of a vehicle, of a bracket depending from the frame, a compound flat spring, a block inserted between the members of the spring and secured to the latter, a pivotal connection between the block and bracket, means for connecting one end of both members of the spring to an axle of the vehicle, a link pivotally connected to the vehicle frame, an auxiliary link pivoted to the lower member of the spring, and a pivotal connection between the respective links, the upper spring being connected to said links at the point of connection therebetween.

In testimony whereof I affix my signature, in presence of two witnesses.

RALPH W. MORSE.

Witnesses:
 C. C. WOOD,
 M. S. COBB.